(12) United States Patent
Sakai (10) Patent No.: US 6,641,478 B2
(45) Date of Patent: Nov. 4, 2003

(54) DESIGN REEL FOR GAMING MACHINE

(75) Inventor: Ryo Sakai, Minato-ku (JP)

(73) Assignee: Konami Corporation, Tokyo (JP)

( * ) Notice: Subject to any disclaimer, the term of this patent is extended or adjusted under 35 U.S.C. 154(b) by 0 days.

(21) Appl. No.: 09/887,228

(22) Filed: Jun. 22, 2001

(65) Prior Publication Data

US 2002/0173356 A1 Nov. 21, 2002

(30) Foreign Application Priority Data

May 16, 2001 (JP) ......................................... 2001-146635

(51) Int. Cl.[7] ................................................. A63F 13/00
(52) U.S. Cl. ........................ 463/32; 463/31; 273/143 R; 273/142 A
(58) Field of Search ......................... 273/143 R, 142 A, 273/142 B, 142 C, 142 D; 463/30, 31, 32, 33, 34

(56) References Cited

U.S. PATENT DOCUMENTS

| | | | | |
|---|---|---|---|---|
| 4,398,723 A | * | 8/1983 | Erickson et al. | 273/313 |
| 4,605,231 A | * | 8/1986 | Richman | 273/157 |
| 4,831,765 A | * | 5/1989 | Bradshaw | 43/42.32 |
| 5,103,325 A | * | 4/1992 | Andrews et al. | 359/23 |
| 5,142,384 A | * | 8/1992 | Wood et al. | 359/3 |
| 5,191,449 A | * | 3/1993 | Newswanger | 359/22 |
| 5,316,303 A | * | 5/1994 | Trudeau et al. | 273/121 A |
| 5,395,111 A | * | 3/1995 | Inoue | 273/143 R |
| 5,449,173 A | * | 9/1995 | Thomas et al. | 273/143 R |
| 5,492,370 A | * | 2/1996 | Chatwin et al. | 283/110 |
| 5,580,055 A | * | 12/1996 | Hagiwara | 273/143 R |
| 5,642,884 A | * | 7/1997 | Pitcher | 273/157 R |
| 5,683,296 A | * | 11/1997 | Rasmussen | 463/20 |
| 5,693,407 A | * | 12/1997 | Swanson, Jr. | 428/195 |
| 5,752,881 A | * | 5/1998 | Inoue | 463/20 |
| 5,934,672 A | * | 8/1999 | Sines et al. | 273/143 R |
| 6,027,115 A | * | 2/2000 | Griswold et al. | 273/143 R |
| 6,086,066 A | * | 7/2000 | Takeuchi et al. | 273/143 R |
| 6,102,396 A | * | 8/2000 | Liu | 273/143 R |

FOREIGN PATENT DOCUMENTS

| | | | | |
|---|---|---|---|---|
| GB | 2145266 A | * | 3/1985 | G07F/17/34 |
| GB | 2194093 A | * | 2/1988 | G07F/17/34 |
| JP | 4-90777 | | 3/1992 | |
| JP | 6-269535 | | 9/1994 | |
| JP | 6-327808 | | 11/1994 | |
| JP | 10263142 A | * | 10/1998 | A63F/5/04 |
| JP | 10-290856 | | 11/1998 | |
| JP | 10309345 A | * | 11/1998 | A63F/5/04 |

* cited by examiner

Primary Examiner—Gene Mancene
Assistant Examiner—Frederick Nicolas
(74) Attorney, Agent, or Firm—Welsh & Katz, Ltd.

(57) ABSTRACT

Design display reel for a gaming machine capable of displaying designs that look different from and more luxurious than printed designs and are therefore more entertaining, which are readily distinguishable from other designs and which afford greater latitude in design. The design display reel is wrapped with design sheets printed with a plurality of types of designs wherein at least one of the designs is furnished with a design region having a holographic material.

3 Claims, 11 Drawing Sheets

DESIGN REEL FOR GAMING MACHINE

CROSS-REFERENCE TO RELATED APPLICATIONS

This application is based upon and claims the benefit of priority from the prior Japanese Patent Application No. 2001-146635, filed on May 16, 2001; the entire contents of which are incorporated herein by reference.

BACKGROUND OF THE INVENTION

1. Field of the Invention

The present invention relates to the structure of a design display reel that rotates and displays designs in a gaming machine such as a slot machine and more particularly to the structure of designs on a design sheet to be mounted around the outer periphery of the design display reel.

2. Description of the Related Art

Figure 9:
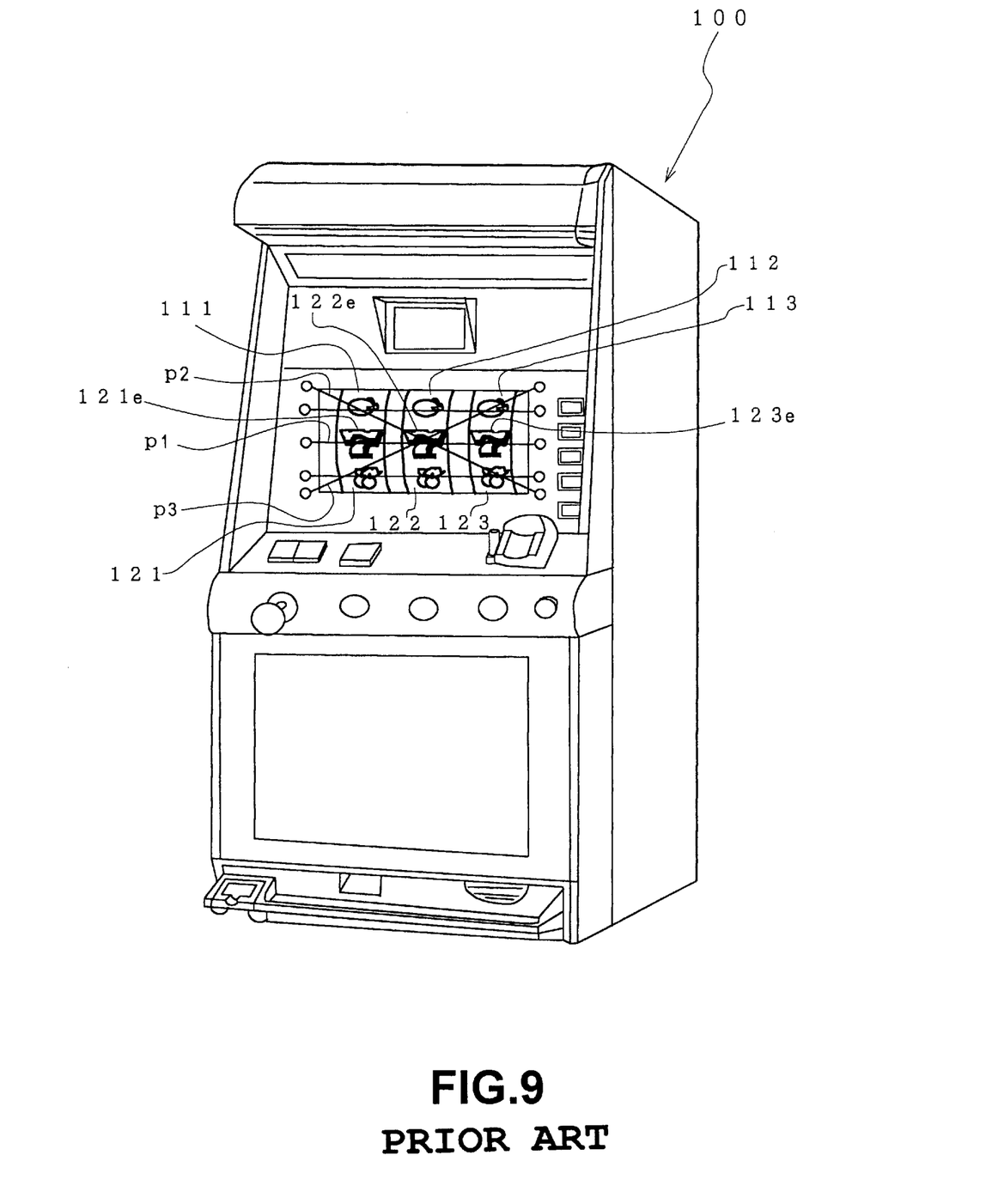
FIG. 9 is a perspective view of a gaming machine equipped with a conventional design display reel.

Conventionally, with a slot machine or other such gaming machine 100, as shown in FIG. 9, three design display reels 111, 112 and 113 are rotated and then halted and the object of the slot game is to make the designs on a plurality of design display reels displayed at display lines p1, p2 and p3 match up in a specific configuration.

The design display reels 111, 112 and 113 of the gaming machine 100 are rotated by a built-in motor (not shown) and designs 121e, 122e, 123e and so forth are drawn on design sheets 121, 122 and 123 mounted around the outer peripheries of the design display reels 111, 112 and 113, respectively.

Lamps (not shown) are respectively housed in the design display reels 111, 112 and 113 and the designs displayed on the design display reels 111, 112 and 113 are illuminated from within by these lamps, so that the display stands out visually to the player who faces in front of the gaming machine 100 and plays the game.

Figure 10A:
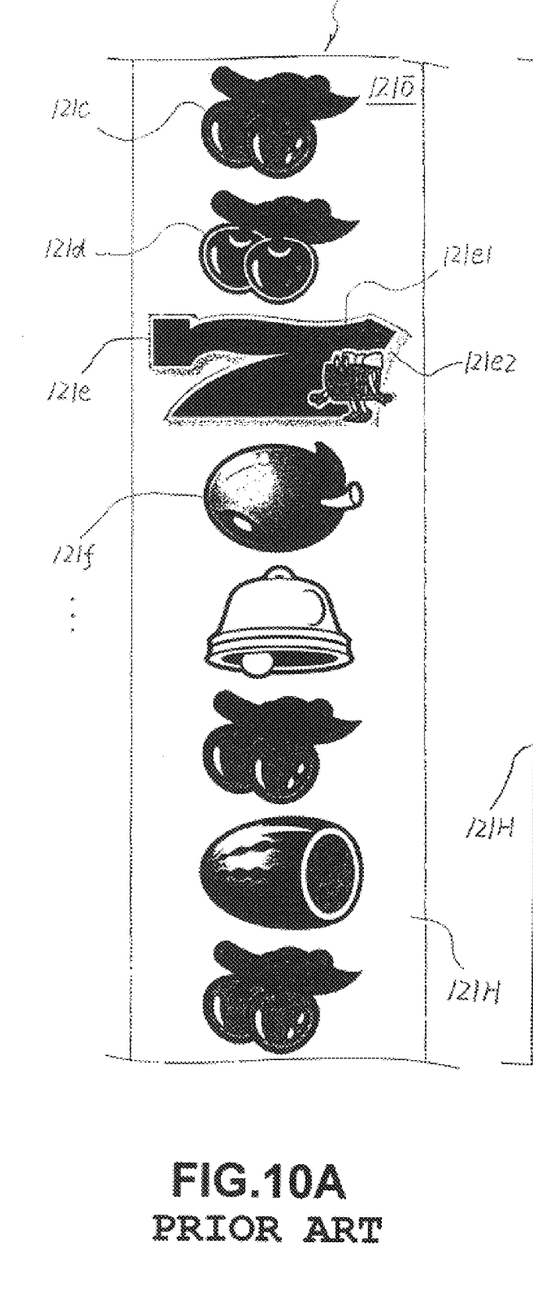
FIGS. 10A and 10B are diagrams of the front and back of the design sheet of the design display reel with a conventional gaming machine.
Figure 10B:
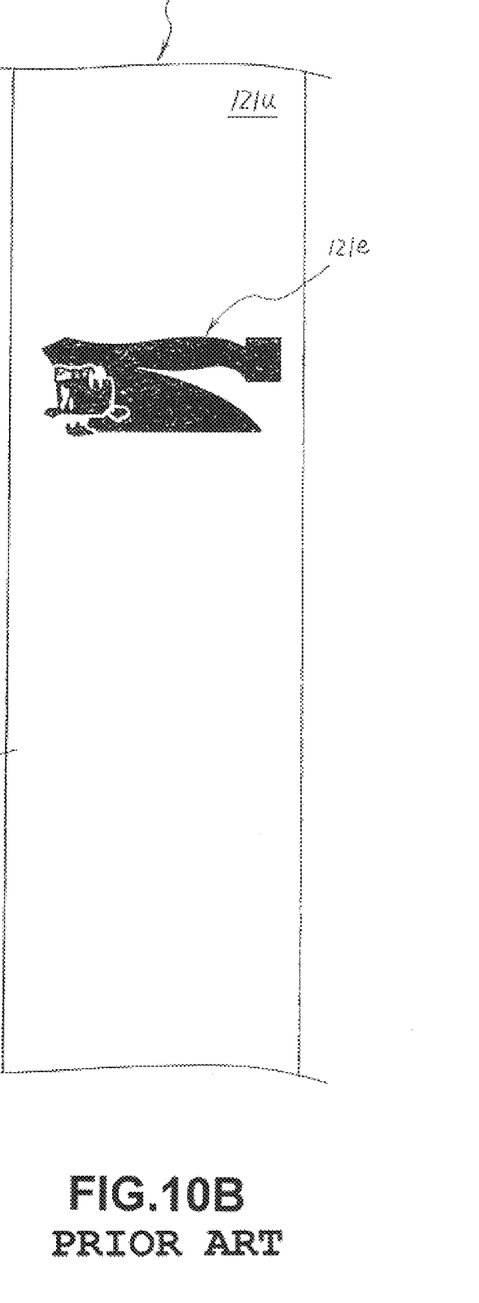

Base material from which the design sheet 121 is made is a polycarbonate that is transparent and flexible and as can be seen from FIG. 10A, which shows the front of the design sheet 121 and FIG. 10B, which shows the back of the design sheet 121, a plurality of designs 121c, 121d, 121e, 121f and so on are drawn so as to be visible to the player from in front of the sheet front 121o.

The design 121e drawn on the design sheet 121 is a winning design, with the player winning when the designs displayed on a plurality of design display reels are aligned on the same display line p1, p2, or p3 when the design display reel 111 comes to a stop during a slot game and the other designs 121c, 121d, 121f and so on are ordinary designs not set as winning designs.

The ordinary designs 121c, 121d, 121f and so on are drawn in colored, opaque inks of red, yellow, blue, green and so forth.

Figure 11A:
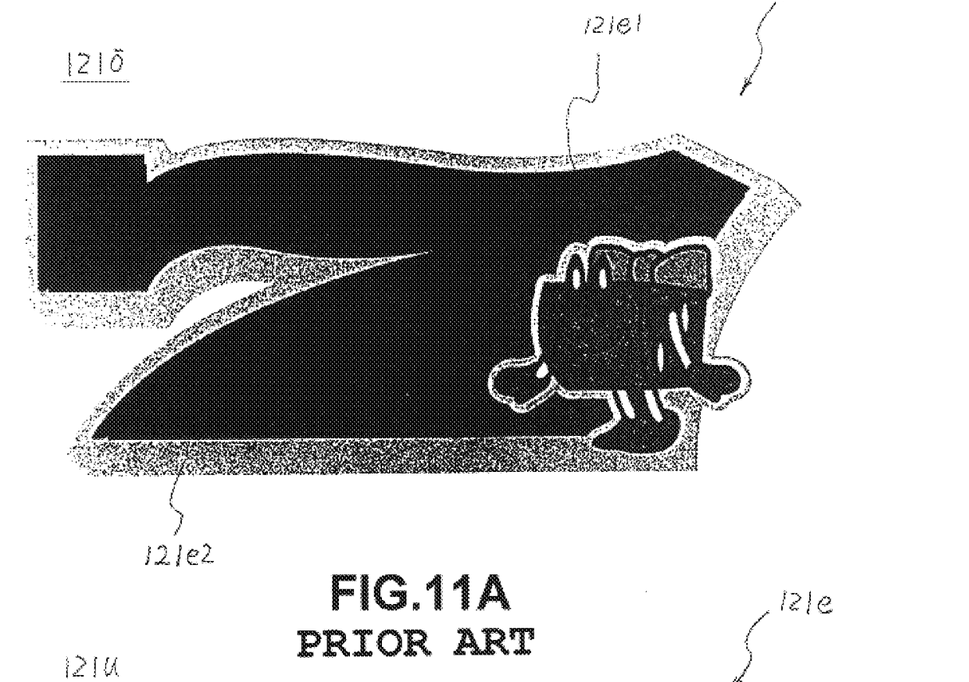
FIGS. 11A and 11B are an enlarged view of the winning design 121*e* in FIG. 10A and an enlarged view of the winning design 121*e* in FIG. 10B, respectively.
Figure 11B:
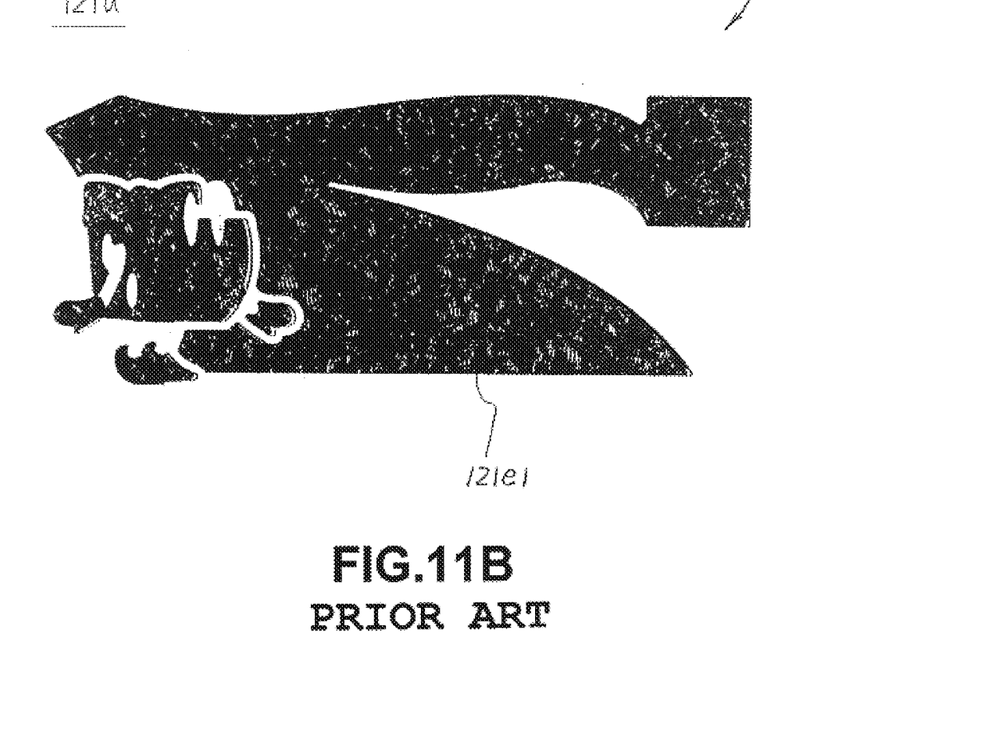

In contrast, with the winning design 121e, the periphery 121e2 thereof is drawn using a mirror ink in gold, silver, or another such color having a metallic gloss, as shown in FIG. 11A, which is an enlarged view from the sheet front 121o and FIG. 11B, which is an enlarged view from the sheet back 121u, while the center part 121e is drawn using transparent, colored crinkle ink or transparent, colored regular ink having a hue of red, blue, or the like. Crinkle ink is used in the example shown here (See FIG. 11B.)

The background region 121H, which is the background of the designs 121c, 121d, 121e, 121f and so on of the design sheet 121, is applied in a strip using white ink.

The design sheets 122 and 123 shown in FIG. 9 are the same as the design sheet 121 and will therefore not be described.

As discussed above, the ordinary designs are printed in their entirety using colored, opaque ink, whereas the periphery of the winning design is printed using an opaque mirror ink, while the center part is printed using a colored, transparent ink.

Since the designs displayed on the design display reels are illuminated by lamps from inside the reels, the center part of the winning design printed using a colored, transparent ink stands out to the player because of the illuminating light of the lamp, which allows the player to distinguish the winning design from the ordinary designs.

There are also different kinds of winning design, for big, medium and small wins and these must be displayed so that the player can clearly differentiate between big, medium and small wins.

Accordingly, since the center part of a winning design is illuminated by lamp light and therefore stands out to the player, the various winning designs are differentiated by varying the color of the transparent, colored crinkle ink or transparent, colored regular ink used in the center of the designs.

However, because the various winning designs are merely differentiated by varying their color, their presentation is somewhat monotonous and the range of possible designs is limited.

Also, as mentioned above, the periphery of the winning designs is printed using a mirror ink of gold, silver, or another such color having a metallic gloss. However, a design made in mirror ink can sometimes appear lacking in luxurious appearances, or can even look black depending on the angle of the illuminating light.

In addition, the designs applied as above definitely appear to the player to have that "printed" look and there is a desire among persons in this industry to come up with a novel design that affords greater freedom of design and gives the player a different impression in quality from that of printed designs.

SUMMARY OF THE INVENTION

In light of the above situation, it is an object of the present invention to provide a design display reel for a gaming machine, with which it is possible to display designs that look different from and more elegant than printed designs and are therefore more entertaining, which are readily distinguishable from other designs and which afford greater latitude in design.

In order to achieve the stated object, one aspect of the present invention provide a design display reel for a gaming machine, adapted to mount a design sheet printed with a plurality of types of designs, wherein at least one of the designs is furnished with a design region having a holographic material.

With this configuration, because a holographic material is used for at least part of the region of the designs displayed on the design display reel of a gaming machine, the designs have a three-dimensional look and look more luxurious to the player.

Also, if the holographic material is seen through the transparent portion of a design sheet colored so as to preserve transparency, it is possible to achieve an appearance that combines a flat appearance with a three-dimensional appearance, giving more latitude to the appearance of the designs.

Further, another aspect of the present invention provides a design display reel for a gaming machine, adapted to mount a design sheet printed with a plurality of types of designs, wherein at least one of the designs is furnished with a design region having a design printed portion and a holographic material.

With this configuration, it is possible to achieve an appearance that combines a flat appearance with a three-dimensional appearance by providing a design region having a design printed portion and a holographic material, giving more latitude to the appearance of the designs.

Furthermore, still another aspect of the present invention provides a design display reel for a gaming machine adapted to a design sheet printed with a plurality of types of designs, wherein at least one of the designs is furnished with a design region having a light-blocking design printed portion, a holographic material and a translucent design printed portion.

With this configuration, it is possible to achieve an appearance that combines a flat appearance, a three-dimensional appearance and a highlighted flat appearance by providing a design region having a light-blocking design printed portion, a holographic material and a translucent design printed portion, giving more latitude to the appearance of the designs.

When the design display reel rotates, light appears to the player to sparkle as it is scattered by the hologram part of the designs, which makes the gaming machine more entertaining.

Thus, a design in which a holographic material is used can be differentiated from other designs because it looks to the player to be different from the other designs, affording greater variation and freedom in the design of the designs.

Therefore, according to the present invention, it is possible to achieve a gaming machine design display reel with which the designs look more elegant and entertaining than the appearance afforded by printing and these designs can be differentiated from other designs and furthermore with which it is possible to display designs with greater latitude in design.

DESCRIPTION OF THE PREFERRED EMBODIMENTS

The present invention will now be described in detail on the basis of the drawings illustrating embodiments.

Figure 1:
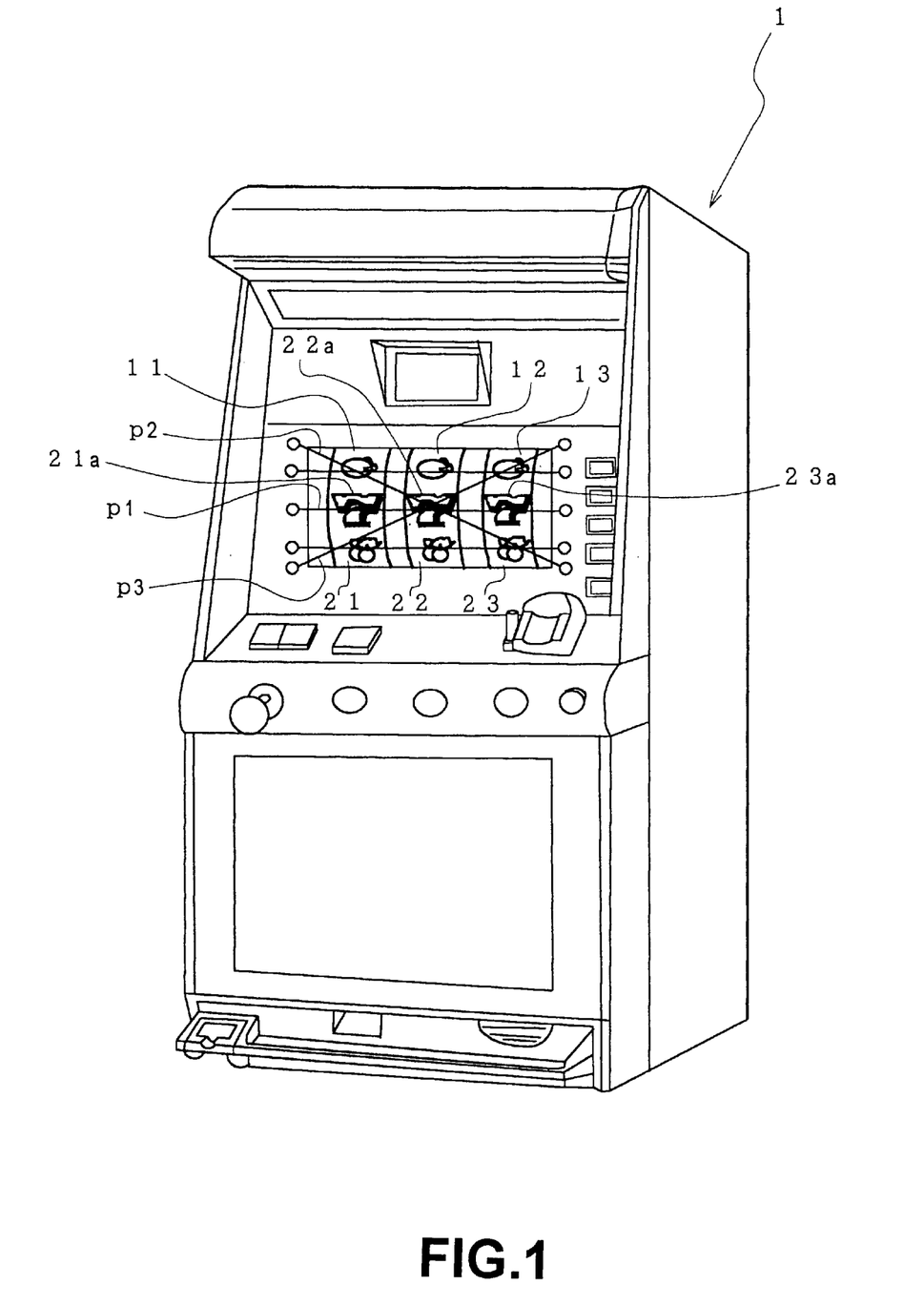
FIG. 1 is a perspective view of the gaming machine in an embodiment of the gaming machine design display reel according to the present invention.

As shown in FIG. 1, with a gaming machine 1, such as a slot machine, three design display reels 11, 12 and 13 are rotated and then halted and the object of the slot game is to make the designs on a plurality of design display reels displayed at display lines p1, p2 and p3 match up in a specific configuration.

The design display reels 11, 12 and 13 of the gaming machine 1 are rotated by a built-in motor (not shown) and designs 21*a*, 22*a*, 23*a* and so forth drawn on design sheets 21, 22 and 23 wrapped around the outer peripheries of these design display reels 11, 12 and 13, respectively, are illuminated from inside the reels by lamps (not shown) provided within the design display reels 11, 12 and 13 and are also illuminated from outside the reels by the lamps of the gaming machine 1 (not shown).

Accordingly, the designs 21*a*, 22*a*, 23*a* and so forth displayed on the design display reels 11, 12 and 13 are highlighted to the player who stands in front of the gaming machine 1.

Figure 2A:
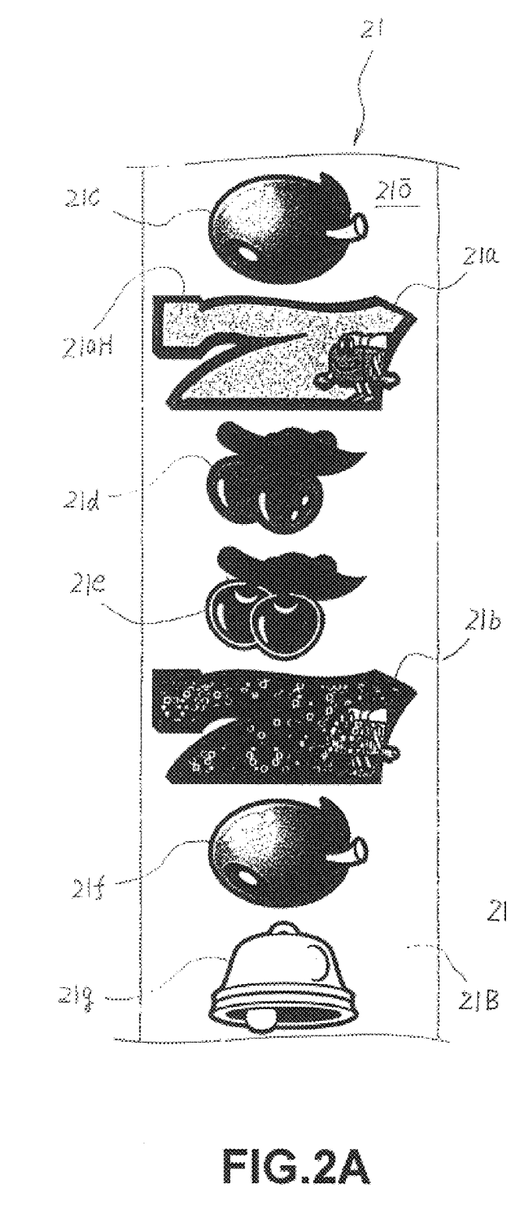
FIGS. 2A and 2B are diagrams of the front and back of the design sheet in an embodiment of the gaming machine design display reel according to the present invention.
Figure 2B:
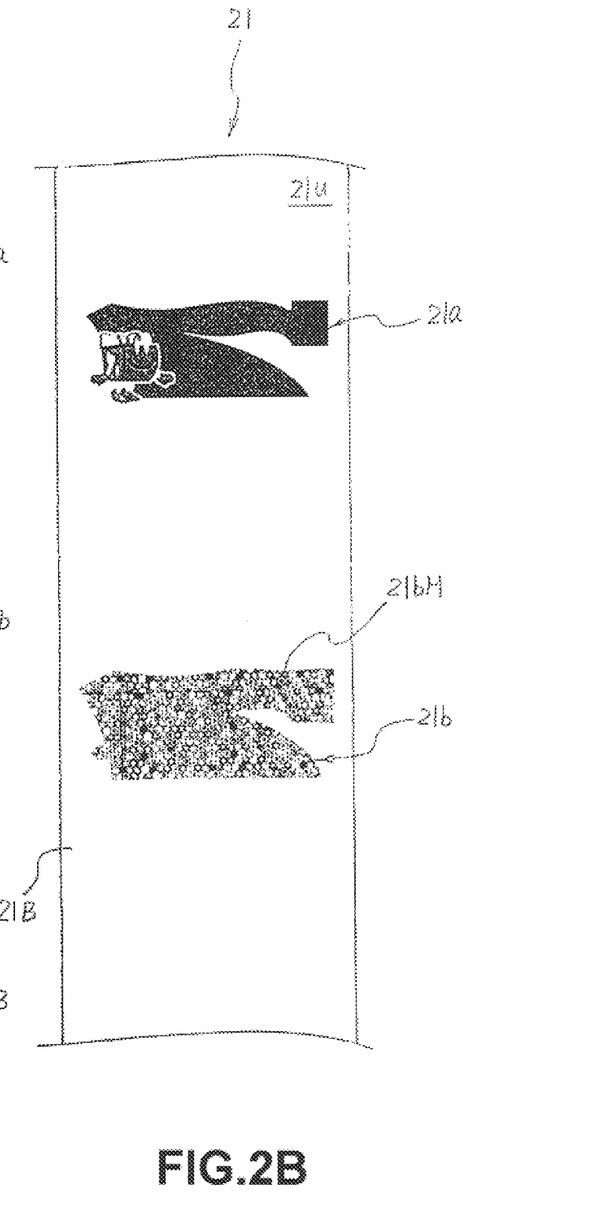

Base material which the above-mentioned design sheet 21 is made from is a polycarbonate that is transparent and flexible and as can be seen from FIG. 2A, which shows the sheet front 21*o* and FIG. 2B, which shows the sheet back 21*u*, designs 21*a*, 21*b*, 21*c*, 21*d*, 21*e*, 21*f*, 21*g* and so on are drawn so as to be visible to the player from in front of the sheet front 21*o*. Similarly, as can be seen from FIG. 3A, which shows the sheet front 21*o* and FIG. 3B, which shows the sheet back 21*u*, designs 21*h*, 21*i*, 21*j*, 21*k* and so on are drawn so as to be visible to the player from in front of the sheet front 21*o*.

The designs 21*a*, 21*b* and 21*i* drawn on the design sheet 21 are winning designs, with the player winning when the designs displayed on a plurality of design display reels are aligned on the same display line p1, p2, or p3 when the design display reel 11 comes to a stop during a slot game and the other designs 21*c*, 21*d*, 21*e*, 21*f*, 21*g*, 21*h*, 21*j* and 21*k* are ordinary designs not set as winning designs.

Figures 3A, 3B:
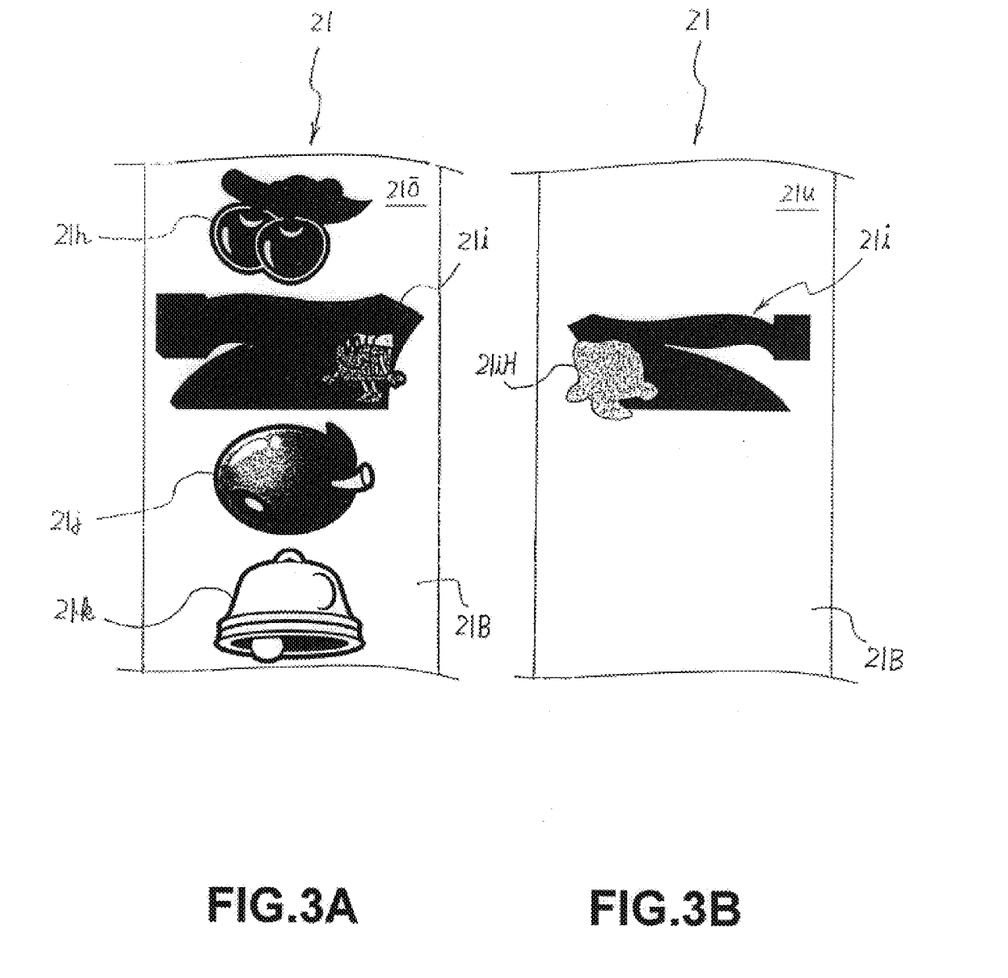
FIGS. 3A and 3B are diagrams of the front of the design sheet not shown in FIG. 2A and the back of the design sheet in FIG. 3A, respectively, in an embodiment of the gaming machine design display reel according to the present invention.

The ordinary designs 21*c*, 21*d*, 21*e*, 21*f*, 21*g*, 21*h*, 21*j* and 21*k* are drawn in colored inks of red, yellow, blue, green, black and so forth.

Figure 4A:
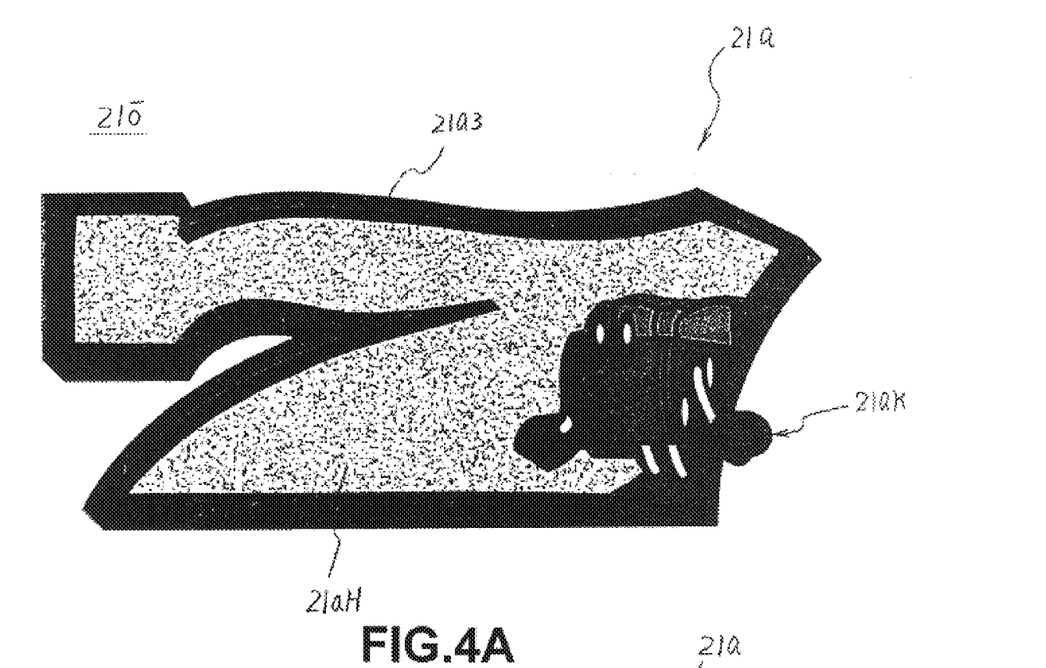
FIGS. 4A and 4B are enlarged view of the winning design 21*a* in FIG. 2A and an enlarged view of the winning design 21*a* in FIG. 2B, respectively.
Figure 5A:
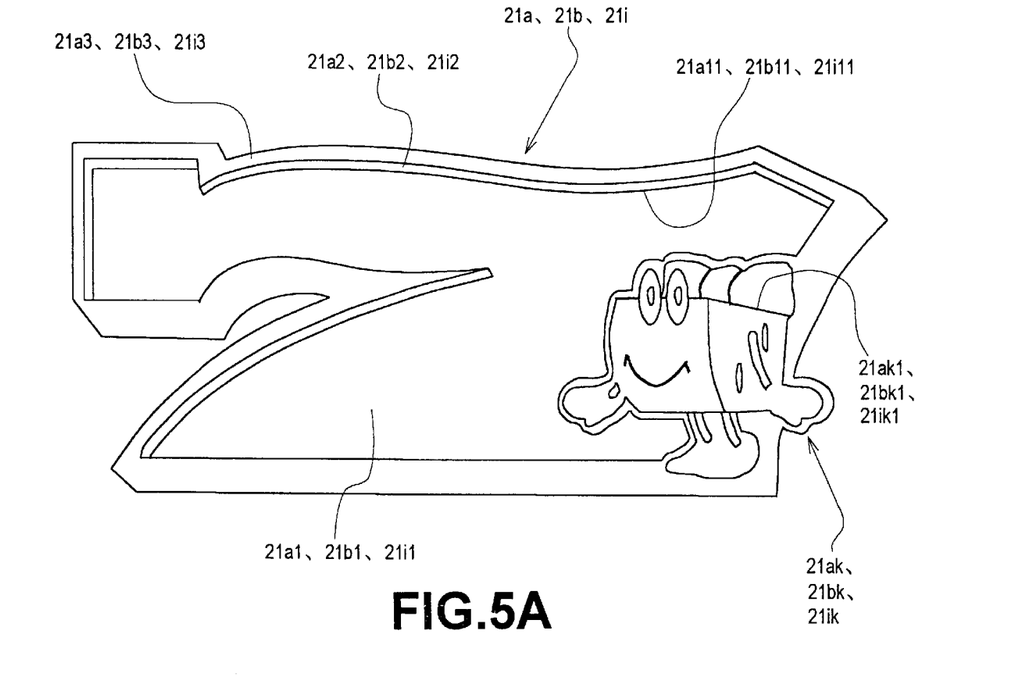
FIGS. 5A and 5B are diagrams illustrating the contour lines of the winning designs 21*a*, 21*b* and 21*i* on the front and back, respectively, of the design sheet in an embodiment of the gaming machine design display reel according to the present invention.

With the above-mentioned winning design (design region) 21*a*3 the outer periphery 21*a*3 thereof (design printed portion and light-blocking design printed portion) is filled in with a mirror ink in gold, silver, or another such color having a metallic gloss, as shown in FIG. 4A, which is an enlarged view of the sheet front 21*o*, while the inner periphery 21a2 (design printed portion and light-blocking design printed portion) is filled in with black ink (see FIG. 5A).

The outer periphery 21a3 filled in with mirror ink and the inner periphery 21a2 filled in with black ink both block light.

The center 21a1 of the winning design 21a (see FIGS. 5A and 5B) is filled in with a transparent colored ink that is blue in color.

Figure 4B:
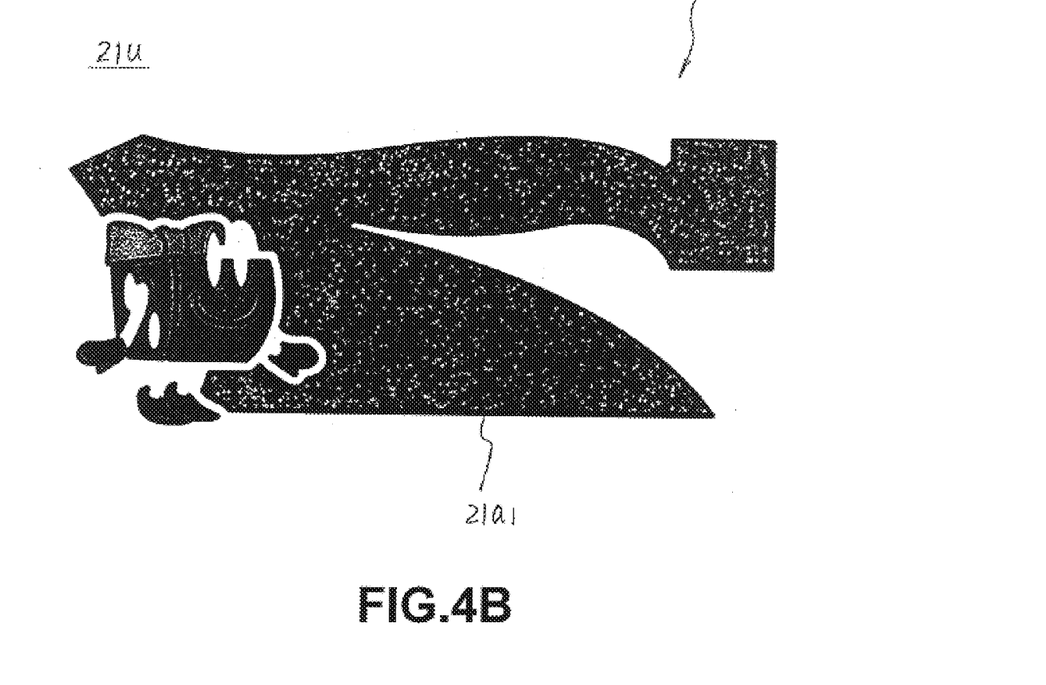

As shown in FIG. 4, with a character 21ak (design printed portion and translucent design printed portion) drawn within the winning design 21a, the portion above a line 21ak1 (see FIGS. 5A and 5B) is filled in with a black ink and a translucent yellow ink except for part of the eyes (translucent design printed portion), while the portion below the line 21ak1 (translucent design printed portion) is filled in with a light blue transparent ink except for one part.

The places that remain transparent within the winning design 21a are filled in with white ink.

As shown in FIG. 4A, on the design sheet front 21o, a hologram (holographic material) 21aH is applied covering the center 21a1 (see FIG. 5A) of the winning design 21a everywhere except where the character 21ak is located (design region).

Figure 8A:
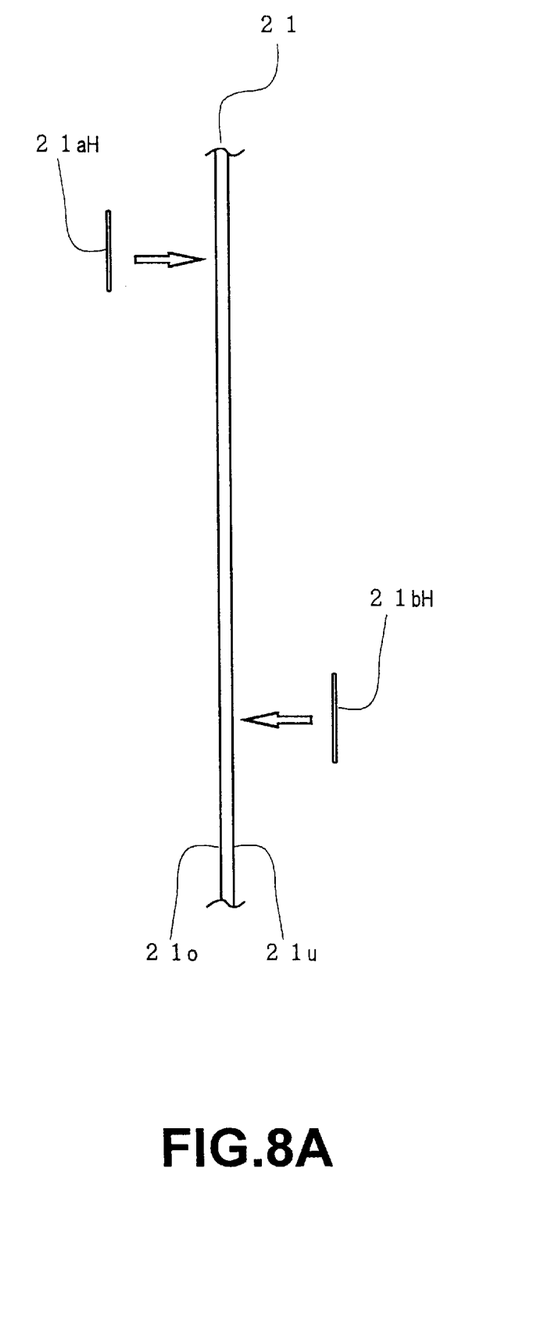
FIG. 8A is a diagram of the method for applying the hologram 21*a*H and the hologram 21*b*H to the design sheet in the design sheet shown in FIG. 2

Specifically, the hologram 21aH, whose size goes beyond the boundary line 21a11 of the center 21a1 (see FIG. 5A) of the winning design 21a on the design sheet front 21o, is applied to the design sheet front 21o as shown in FIG. 8A so as to cover the center 21a1 of the winning design 21a on the design sheet front 21o.

The "hologram" referred to here is a light-blocking device with a three-dimensional look, which is manufactured by subjecting a plastic film to hot pressing in a mold produced by stereoscopic printing and then vapor depositing aluminum or another metal on this plastic film.

Holograms manufactured in this way are used as decorative devices in the cabinets of gaming machines, or are printed and used as stickers.

Therefore, in the winning design 21a, the hologram 21aH, the outer periphery 21a3 printed with mirror ink and the inner periphery 21a2 printed with black ink are displayed as being light-blocking, but the region printed with translucent yellow ink and light blue transparent ink in the character 21ak is translucent, so its display is accentuated by the lamp light.

Figure 6A:
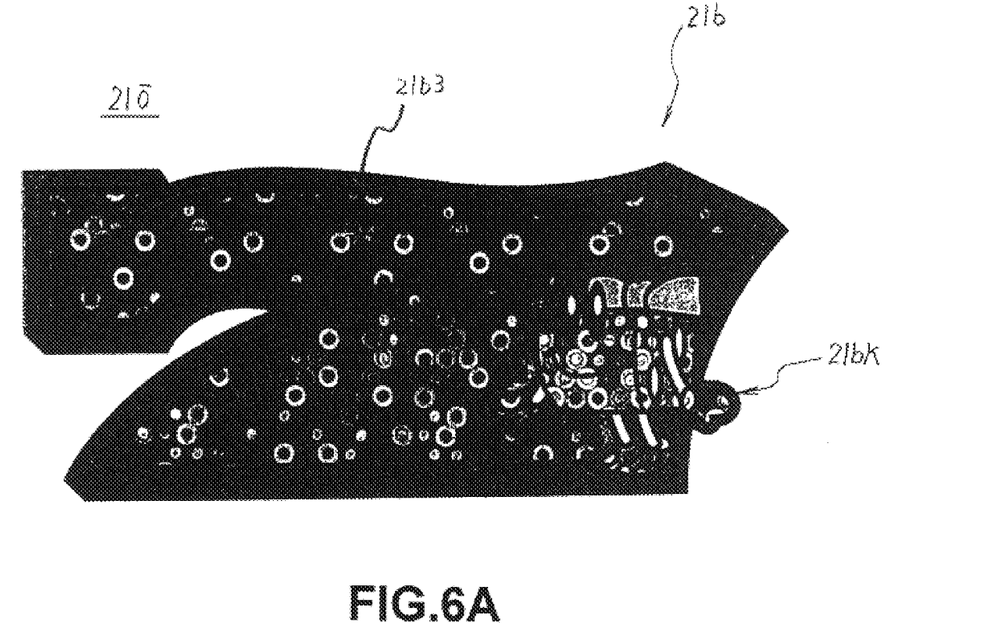
FIGS. 6A and 6B are an enlarged view of the winning design 21*b* in FIG. 2A and an enlarged view of the winning design 21*b* in FIG. 2B, respectively.

With the above-mentioned winning design (design region) 21b, the periphery thereof (design printed portion) 21b3 (see FIG. 5A) is filled in with a mirror ink in gold, silver, or another such color having a metallic gloss, as shown in FIG. 6A, which is an enlarged view of the sheet front 21o, while the inner periphery (design printed portion) 21b2 (see FIG. 5A) is filled in with black ink.

Here, the outer periphery 21b3 filled in with mirror ink and the inner periphery 21b2 filled in with black ink are light-blocking.

The center 21b1 (transparent design portion) of the winning design 21b (see FIGS. 5A and 5B) is filled in with transparent, colored ink that is blue in color.

As shown in FIG. 6, with the character 21bk drawn within the winning design 21b, the portion above a line 21bk(see FIGS. 5A and 5B) is filled in with a black ink and a translucent yellow ink except for part of the eyes (transparent design portion), while the portion below the line 21bk1 (transparent design portion) is filled in with a light blue transparent ink except for one part.

The places that remain transparent within the winning design 21b are filled in with white ink.

Figure 5B:
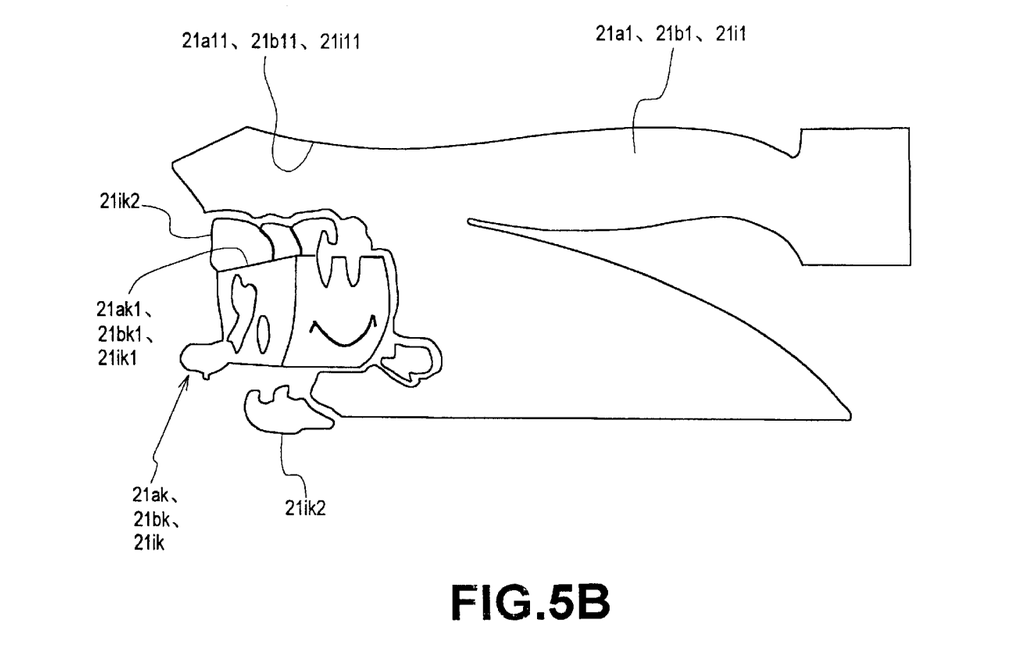
Figure 6B:
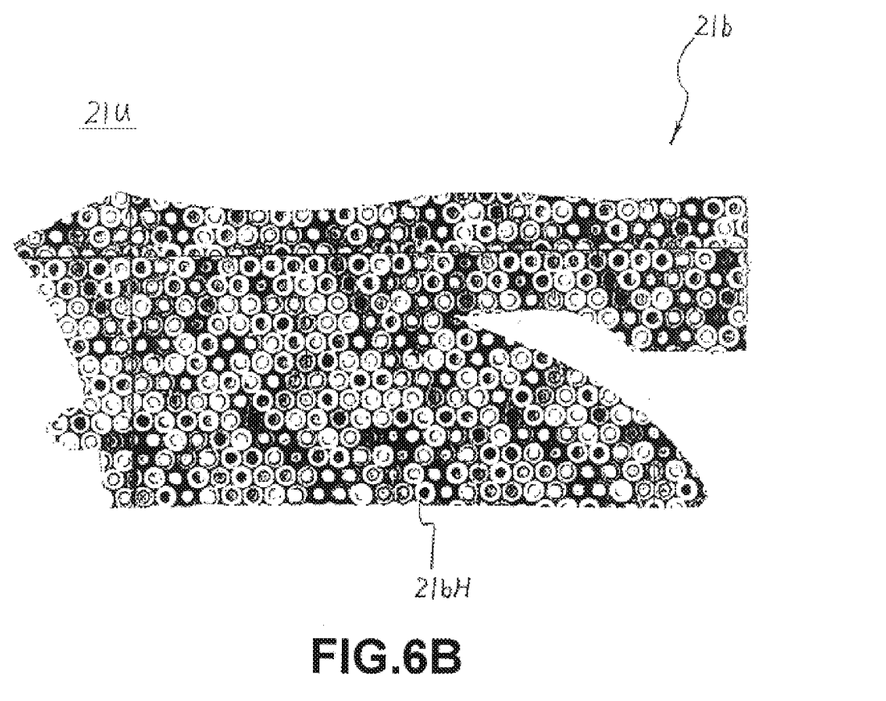

As shown in FIG. 6B, on the design sheet back 21u, a hologram (holographic material) 21bH is applied covering the center 21b1 (see FIG. 5B) of the winning design 21b, including the character 21bk.

Specifically, the hologram 21bH, whose size at least goes beyond the boundary line 21b11 of the center 21b1 of the winning design 21b (see FIGS. 5A and 5B), including the character 21bk, on the design sheet back 21u, is applied to the design sheet back 21u as shown in FIG. 8A so as to substantially cover the winning design 21b on the design sheet back 21u, as shown in FIG. 6B.

Therefore, since the hologram 21bH is affixed to the winning design 21b on the design sheet back 21u covering a translucent region in the character 21bk and the transparent center 21b1, the lamp light in the reel is not transmitted through the winning design 21b, so the winning design 21b appears to the player to be light-blocking.

Figure 7A:
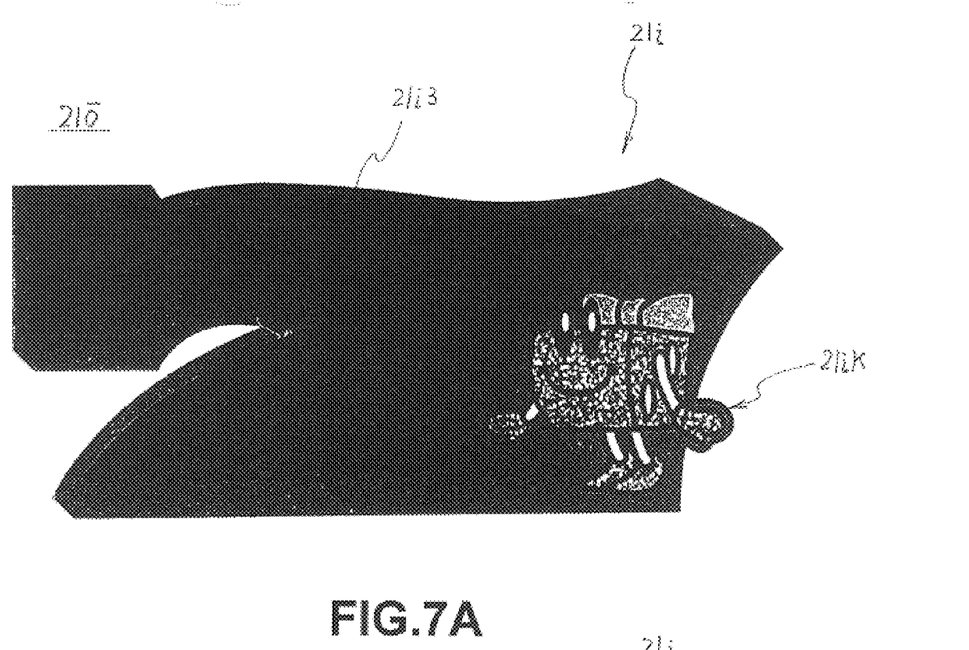
FIGS. 7A and 7B are an enlarged view of the winning design 21*i* in FIG. 3A and an enlarged view of the winning design 21*i* in FIG. 3B, respectively.

With the above-mentioned winning design (design region) 21i, the outer periphery (see FIG. 5A) 21i3 thereof (design printed portion and light-blocking design printed portion) is filled in with a mirror ink in gold, silver, or another such color having a metallic gloss, as shown in FIG. 7A, which is an enlarged view of the sheet front, while the inner periphery (design printed portion and light-blocking design printed portion) 21i2 (see FIG. 5A) is filled in with black ink.

Here, the outer periphery 21i3 filled in with mirror ink and the inner periphery 21i2 filled in with black ink are light-blocking.

The center (transparent design portion) 21i1 of the winning design 21i (see FIGS. 5A and 5B) is filled in with transparent, colored ink that is blue in color.

Figure 7B:
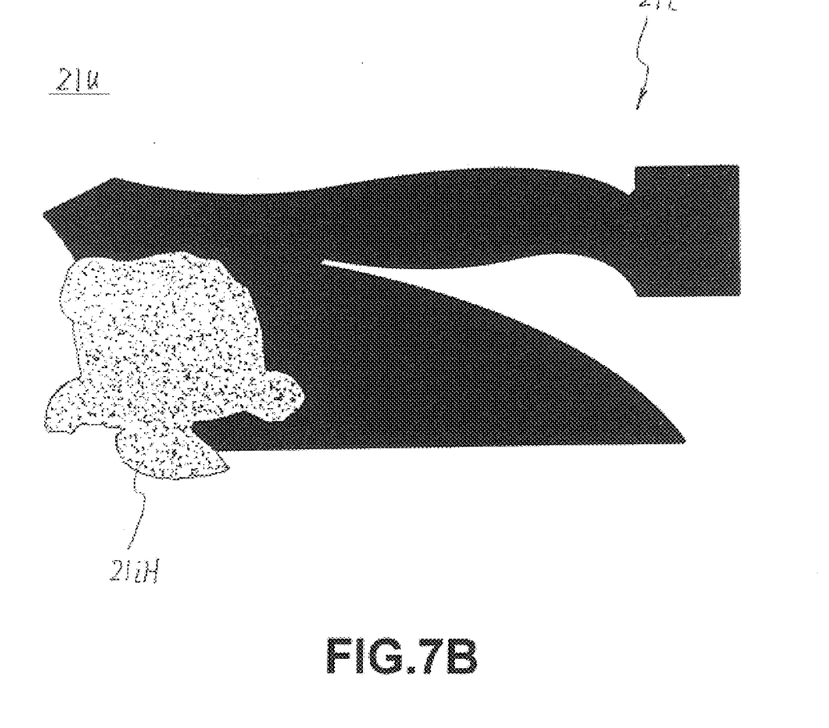

As shown in FIGS. 7A and 7B, with the character 21ik drawn within the winning design 21i, the portion above a line 21ik1 (see FIGS. 5A and 5B) is filled in with a black ink and a translucent yellow ink except for part of the eyes (transparent design portion), while the portion below the line 21ik1 (transparent design portion) is filled in with a light blue transparent ink except for one part.

The places that remain transparent within the winning design 21i are filled in with white ink.

As shown in FIG. 7B, on the design sheet back 21u, a hologram (holographic material) 21iH is applied covering the character 21ik.

Figure 8B:
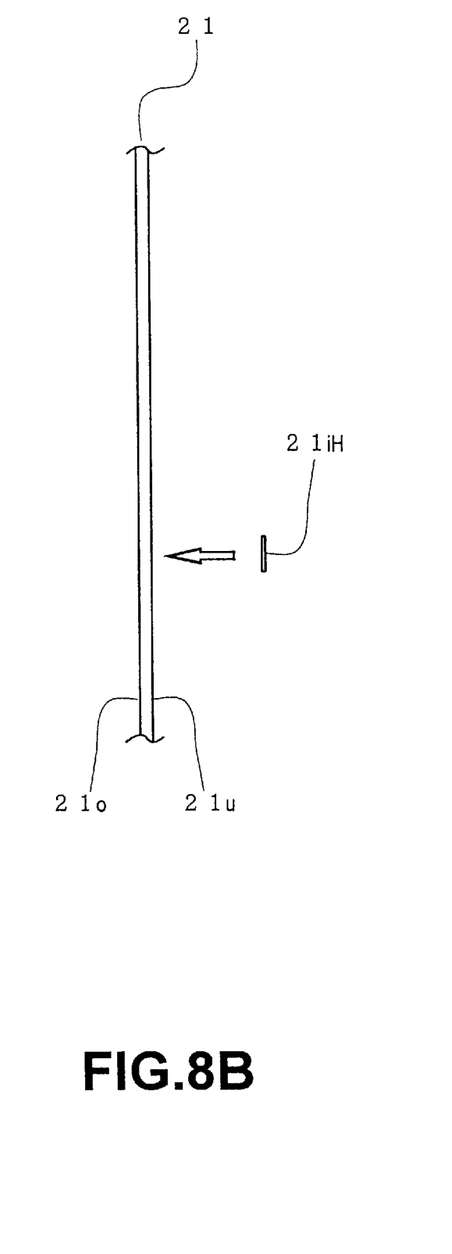
FIG. 8B is a diagram of the method for applying the hologram 21*i*H to the design sheet in the design sheet shown in FIG. 3.

Specifically, as shown in FIG. 5B, the hologram 21iH, whose size covers the silhouette 21ik2 of the character 21ik of the winning design 21i, is applied to the design sheet back 21u as shown in FIG. 8B so as to cover the character 21ik of the winning design 21i on the design sheet back 21u, as shown in FIG. 7B.

Therefore, in the winning design 21i, although the character 21ik is covered by the hologram 21iH on the design sheet back 21u, the translucent center 21i1 is not covered, so the winning design 21i is displayed to the player such that the center 21i1 is highlighted by the lamp light in the reel, while the other regions are displayed as light-blocking.

The background region 21B, which is the background of the designs 21a, 21b, 21c, 21d, 21e, 21f, 21g, 21h, 21i, 21j and 21k of the design sheet 21, is applied in a strip using white ink.

The method for drawing the designs and so forth on the design sheet 21 will now be described.

To produce the designs, the sheet back 21u (polycarbonate) of the transparent design sheet 21 is subjected to silk screening for the number of colors of the designs to be reproduced.

Since red, yellow, blue, green and black are used for the ordinary designs on the design sheet 21, the sheet back 21*u* is silk screened here with yellow, red, blue, green and black screens.

The character 21*ak* drawn inside the winning design 21*a* is such that in the region drawn in black ink above the line 21*ak*1 (see FIGS. 5A and 5B), silk screening of the sheet back 21*u* is performed simultaneously with the above-mentioned black screen of the ordinary designs.

Also, since the inner periphery 21*a*2 of the winning design 21*a* (see FIG. 5A) is drawn in black ink, silk screening of the sheet back 21*u* is performed simultaneously with the above-mentioned black screen of the ordinary designs.

Similarly, the characters 21*bk* and 21*ik* drawn within the winning designs 21*b* and 21*i* are such that in the regions drawn in black ink above the lines 21*bk*1 and 21*ik*1 (see FIGS. 5A and 5B), silk screening of the sheet back 21*u* is performed simultaneously with the above-mentioned black screen of the ordinary designs.

Also, since the inner peripheries 21*b*2 and 21*i*2 of the winning designs 21*b* and 21*i* (see FIG. 5A) are drawn in black ink, silk screening of the sheet back 21*u* is performed simultaneously with the above-mentioned black screen of the ordinary designs.

Meanwhile, for the outer periphery 21*a*3 of the winning design 21*a* (see FIG. 5A), after silk screening is performed using light red ink on the sheet back, silk screening is again performed using a mirror ink of gold, silver, or another such color.

Similarly, for the outer peripheries 21*b*3 and 21*i*3 of the winning designs 21*b* and 21*i* (see FIG. 5A), after silk screening is performed using light red ink on the sheet back, silk screening is again performed using a mirror ink of gold, silver, or another such color.

Next, silk screening is performed in white over the entire surface of the sheet back 21*u* except for those places that are to remain transparent, such as the center 21*a*1 of the winning design 21*a*, the center 21*b*1 of the winning design 21*b*, the center 21*i*1 of the winning design 21*i*, the regions of the character 21*ak* printed using translucent yellow ink and light-blue transparent ink, the regions of the character 21*bk* printed using translucent yellow ink and light-blue transparent ink and the regions of the character 21*ik* printed using translucent yellow ink and light-blue transparent ink.

The center 21*a*1 of the winning design 21*a*, the center 21*b*1 of the winning design 21*b* and the center 21*i*1 of the winning design 21*i* are then subjected to silk screening on the sheet back 21*u* using a transparent ink that is blue in color.

The portion of the character 21*ak* below the line 21*ak*1, the portion of the character 21*bk* below the line 21*bk*1 and the portion of the character 21*ik* below the line 21*ik*1 are then silk screened on the sheet back 21*u* using a transparent ink that is light blue in color.

The regions of the characters 21*ak*, 21*bk* and 21*ik* drawn in translucent yellow ink above the line 21*ak*1, the line 21*bk*1 and the line 21*ik*1 (see FIGS. 5A and 5B) are subjected to silk screening on the sheet back 21*u* with translucent yellow ink.

Then, as shown in FIGS. 4A and 8A, the hologram 21*a*H is applied covering the center 21*a*1 of the winning design 21*a* on the design sheet front 21*o*.

Also, as shown in FIGS. 6B and 8A, the hologram 21*b*H is applied covering the center 21*b*1 including the character 21*bk* of the winning design 21*b* on the design sheet back 21*u* (see FIG. 5B).

Also, as shown in FIGS. 7B and 8B, the hologram 21*i*H is applied covering the character 21*ik* of the winning design 21*i* on the design sheet back 21*u* (see FIG. 5B).

Various designs are drawn on the design sheet 21 through the above steps.

The hologram 21*a*H, the hologram 21*b*H and the hologram 21*i*H may also each have a different appearance.

A hologram laminate (holographic material) which is a hologram that transmits light may also be used in place of the hologram 21*a*H, the hologram 21*b*H, or the hologram 21*i*H.

It should also go without saying that it is possible to suitably combine a hologram with a hologram laminate and that it is possible to suitable combine holograms and hologram laminates each having a different appearance.

The design sheet 22 and the design sheet 23 are produced by the same method as the above-mentioned design sheet 21, so the design sheet 22 and the design sheet 23 will not be described.

With the above constitution, since a hologram is used for at least part of the designs displayed on the design display reels of a gaming machine, these holograms give the designs a three-dimensional look that is unlike the printed look of designs made by printing, making these designs look more elegant to the player.

Also, if a design made by printing is lined up in the planar direction with a design made by the application of a hologram in the designs, it is possible to achieve a look that combines a flat appearance with a three-dimensional appearance, giving more latitude to the appearance of the designs.

Also, if a hologram is applied by lamination over printing on the design sheet back where a colored transparent ink has been used for the designs on the design sheet, the hologram can be seen through the colored transparent design sheet, affording an appearance that integrates a flat appearance with a three-dimensional appearance and giving more latitude to the appearance of the designs.

Furthermore, if a design made by printing, a design made by the application of a hologram and a design made by printing using a colored transparent ink are lined up in the planar direction in the designs, it is possible to achieve a look that combines a flat appearance, a three-dimensional appearance and a flat appearance that is highlighted by the lamp light from within the reel, once again giving more latitude to the appearance of the designs.

When the design display reel rotates, light appears to the player to sparkle as it is scattered by the hologram part of the designs, which makes the gaming machine more entertaining.

Thus, a design in which a hologram is used can be differentiated from other designs because it looks to the player to be different from the other designs. For instance, winning designs can be differentiated among by giving each of them a different look, affording greater variation between the designs.

Even more differentiation among designs can be achieved by providing a hologram to at least part of the design sheet front, or to at least part of the design sheet back, or by using various combinations of holograms with different appearances.

Furthermore, the above-mentioned effects can be further enhanced by applying a light-transmitting hologram laminate instead of a hologram, or by applying a combination of a hologram and a hologram laminate.

Therefore, it is possible to achieve a gaming machine design display reel with which the designs look more elegant and entertaining than the appearance afforded by printing and these designs can be differentiated from other designs and furthermore with which it is possible to display designs with greater latitude in design.

A design display reel for a gaming machine such as a slot machine was discussed in the embodiments given above, but it should go without saying that the gaming machine design display reel according to the present invention can also be effectively applied to other gaming machines having a design display reel.

What is claimed is:

1. A design display reel for a gaming machine adapted to a design sheet printed with a plurality of types of designs, wherein at least one of the designs is furnished with a design region having a light-blocking design printed portion, a holographic material and a translucent design printed portion so as to be differentiated from other designs, the light-blocking design printed portion, the holographic material and the translucent design printed portion being arranged in a planar fashion without overlapping each other.

2. The design display reel for a gaming machine according to claim 1, wherein the design region has the holographic material on the front surface of the design sheet.

3. The design display reel for a gaming machine according to claim 1, wherein the design region has the holographic material on the back surface of the design sheet.

* * * * *